Figure 1:
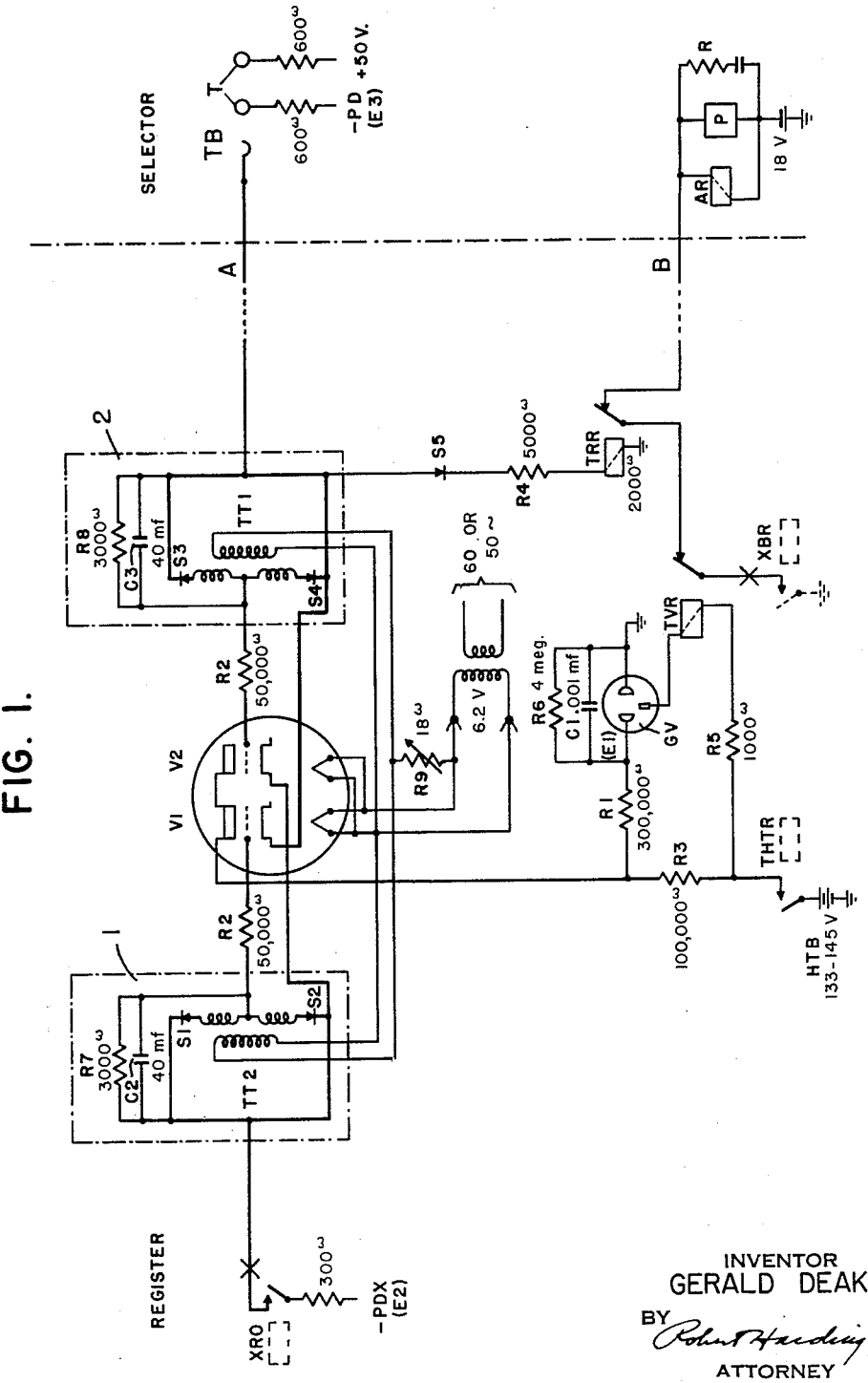

FIG. I.

INVENTOR
GERALD DEAKIN

INVENTOR.
GERALD DEAKIN
BY
*Robert Harding Jr.*
ATTORNEY

INVENTOR.
GERALD DEAKIN
BY Robert Harding Jr.
ATTORNEY

INVENTOR.
GERALD DEAKIN

July 10, 1951

G. DEAKIN 2,559,601

AUTOMATIC SELECTOR CONTROL SYSTEM

Filed Nov. 13, 1946

8 Sheets-Sheet 7

CR12 Closes Second Test Ct.

Called Line Made Busy

Immediate Ringing Of Called Line

Machine Ringing Of Called Line

INVENTOR.
GERALD DEAKIN

BY Robert Harding Jr.
ATTORNEY

July 10, 1951　　　　　　　G. DEAKIN　　　　　　　2,559,601
AUTOMATIC SELECTOR CONTROL SYSTEM
Filed Nov. 13, 1946　　　　　　　　　　　　　　　8 Sheets-Sheet 8

*INVENTOR.*
GERALD DEAKIN
BY
ATTORNEY

Patented July 10, 1951

2,559,601

UNITED STATES PATENT OFFICE 2,559,601

AUTOMATIC SELECTOR CONTROL SYSTEM

Gerald Deakin, New York, N. Y., assignor to International Standard Electric Corporation, New York, N. Y., a corporation of Delaware Application November 13, 1946, Serial No. 709,539

27 Claims. (Cl. 179—18)

This invention relates to new and useful improvements in telecommunication systems and more particularly in register controllers for automatic telephone exchange systems.

The register is of the multi-potential type, that is to say, one provided with detector means, e. g. a pair of triodes and an associated gas valve, operable only when two potentials applied thereto bear a predetermined relationship to one another, e. g. they are the same. One of the potentials is applied to the detector in the register to represent a digit of a called number or any other selecting operation that it is desired to perform, and the other potential is applied to the detector by a selector or line finder switch under control.

According to one of the features of the invention, the detector comprises, in addition to the customary tube or tubes, an electromechanical relay which is also capable of controlling the selecting operation and responds directly to the application of potential by a line finder or selector. By connecting this relay through a unidirectional device, such as a rectifier, with the path over which selectors or line finders apply potentials to the detector, the relay will be operated when current flows in a predetermined direction over the selector side of the detector or fundamental circuit. The single relay with its rectifier thus replaces a second set of tubes that would otherwise be required for controlling the operation of line finder and final selector switches.

According to another feature of the invention, the tubes of the register are twice tested; first when the register is picked up and second when it is released. The first test is for the maximum non-firing voltage of the gas valve and the second test is for the minimum firing voltage of the valve.

Still another feature of the invention has to do with the prompt busying of a trunk selected by a selector by grounding one of the talking conductors under the control of a quick-releasing relay in the register, thus reducing to a minimum the double seizure of the trunk during the release time of the relay customarily associated with the selector.

Another feature of the invention provides for the attachment of trunk pulsing circuits over terminals provided in the register, permitting the use of such equipment only when and if required rather than permanently associating it with the register.

The invention provides for a simplified final selector circuit which does not require a special contact for starting the tens hunting operation. The second test of the called subscriber's line is made over the C-brush of the final.

Still another feature provides for what I call "X-line service." This service is employed when an exchange becomes crowded and no vacancy exists in the final selector terminal bank. Additional lines may be accommodated by utilizing certain final terminals customarily employed to take care of special services, such as the routing of calls directed to non-existent numbers. When the final reaches those terminals the attempted connection is broken down and a new connection is established by introducing an additional selecting operation which transfers the call to a new set of appropriate thousands, hundreds and final selectors. The digit storing relays in the register remain locked up so that the called number is repeated over the new string of switches. By providing flexible cross connections a wide variety of lines may thus be handled.

These and other features will more clearly appear from the following detailed description and the appended claims.

Figure 2:
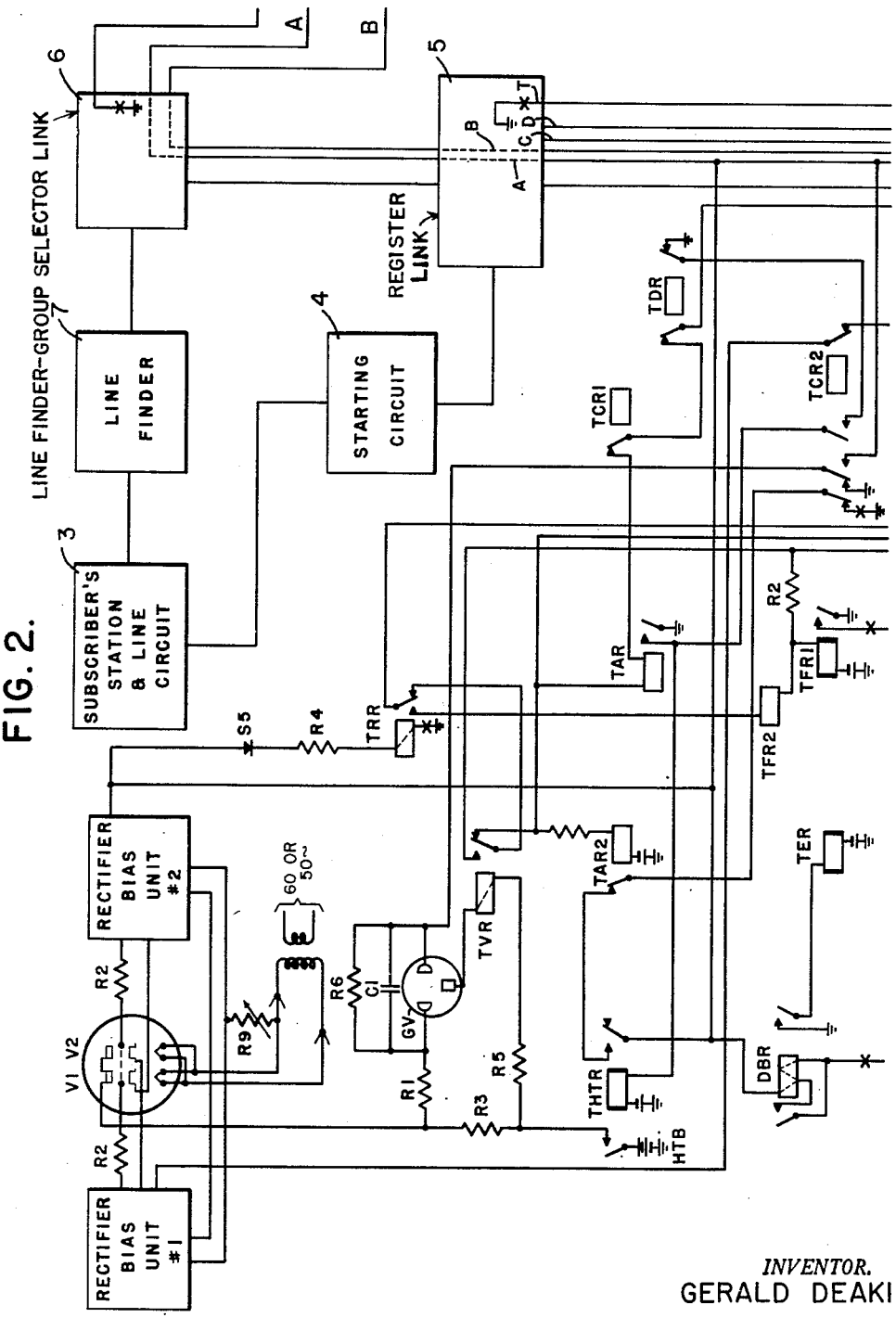
Figure 3:
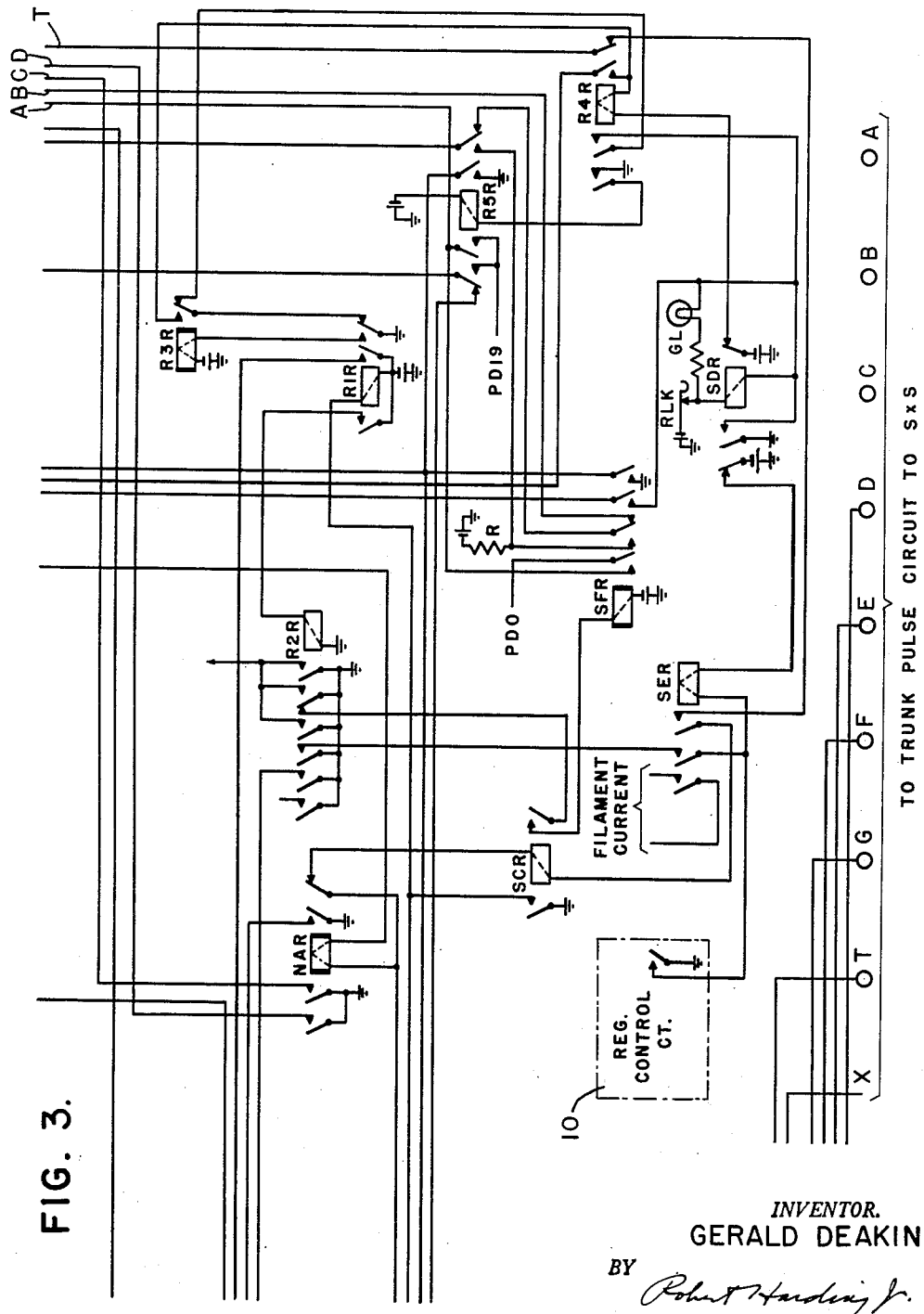
Figure 4:
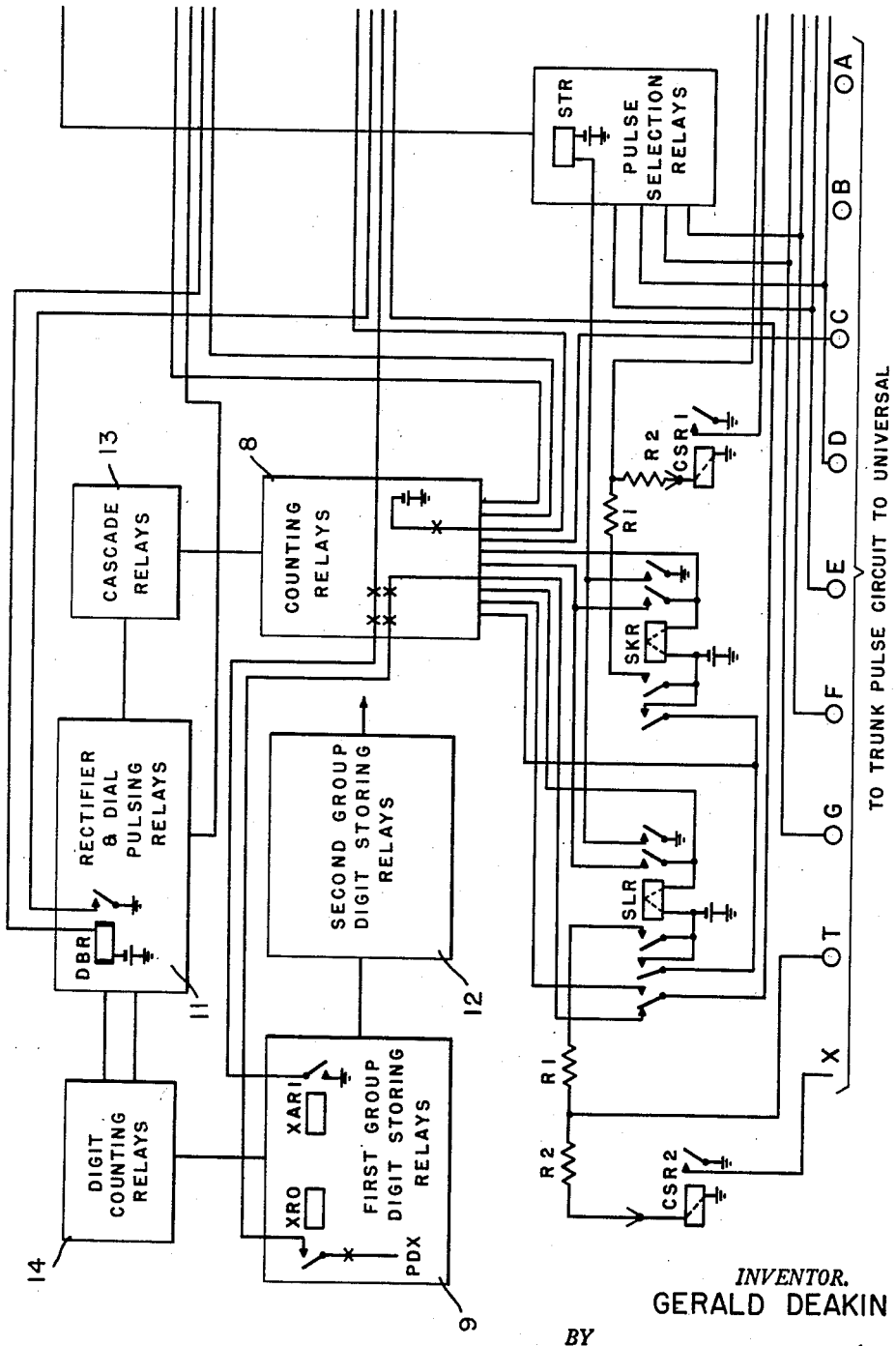
Figure 5:
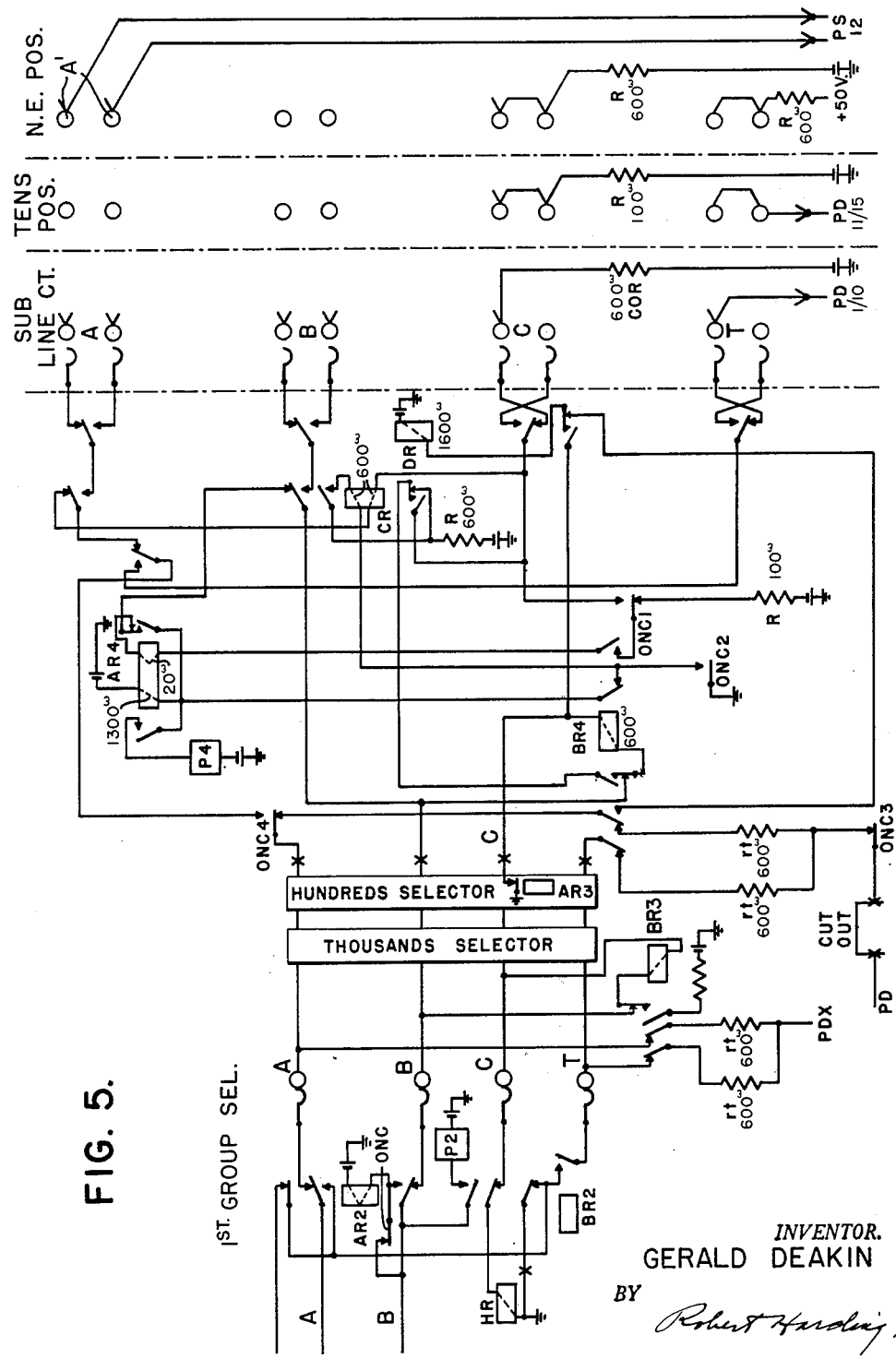
Figure 6:
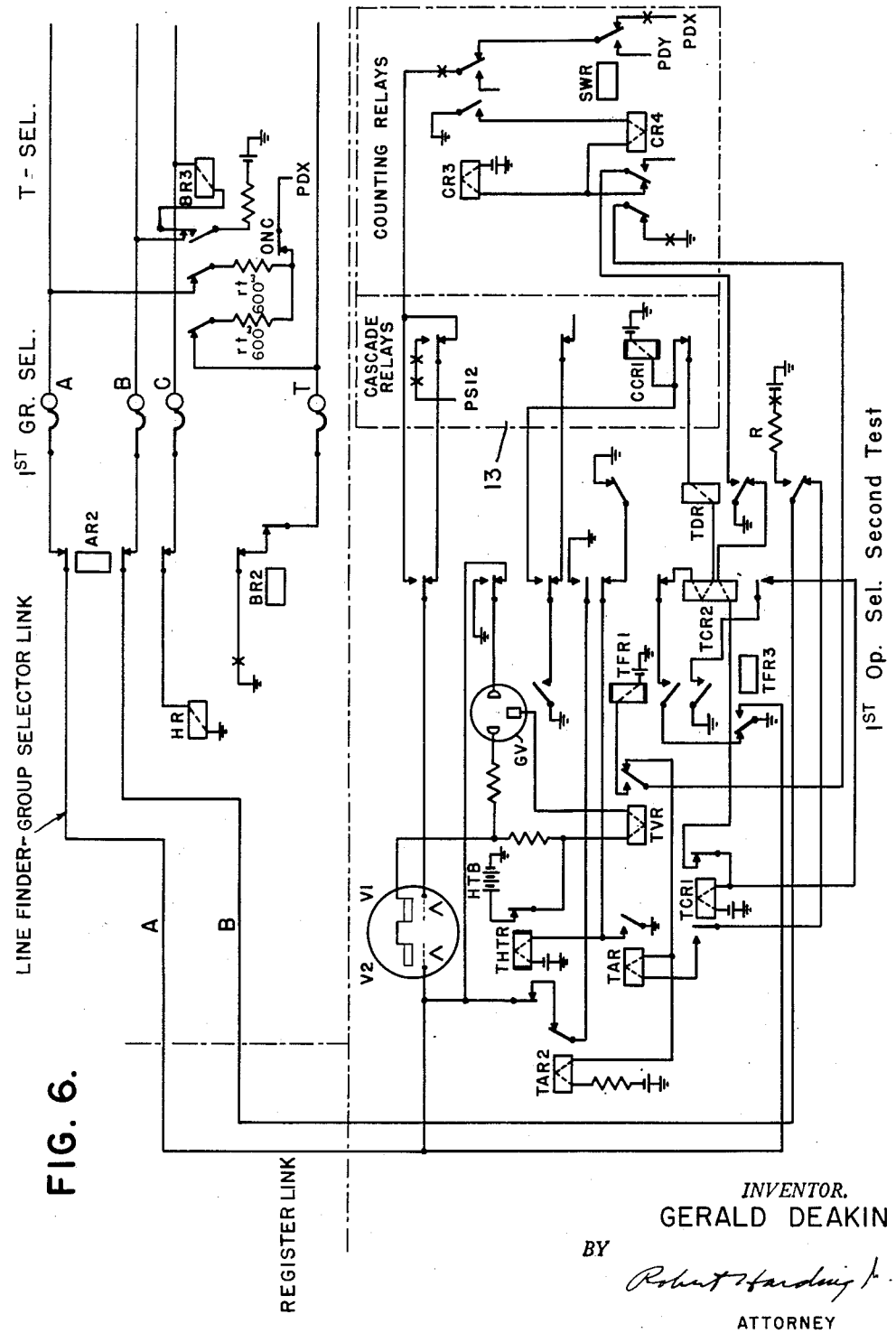
Figure 8:
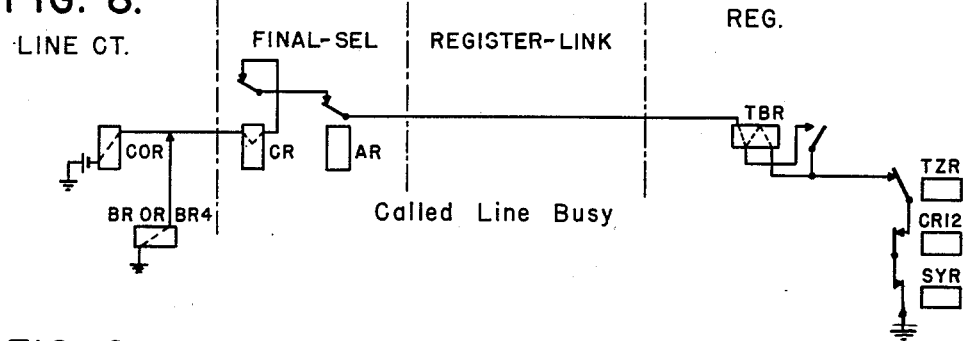
Figure 8A:
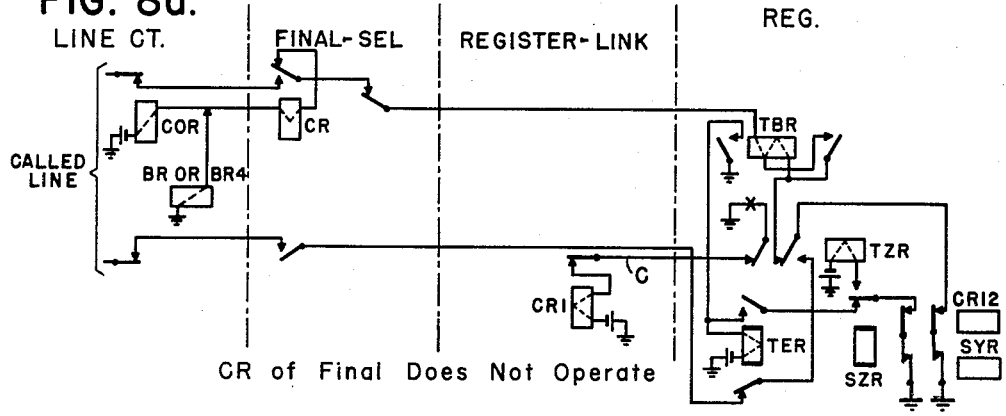
Figure 8B:
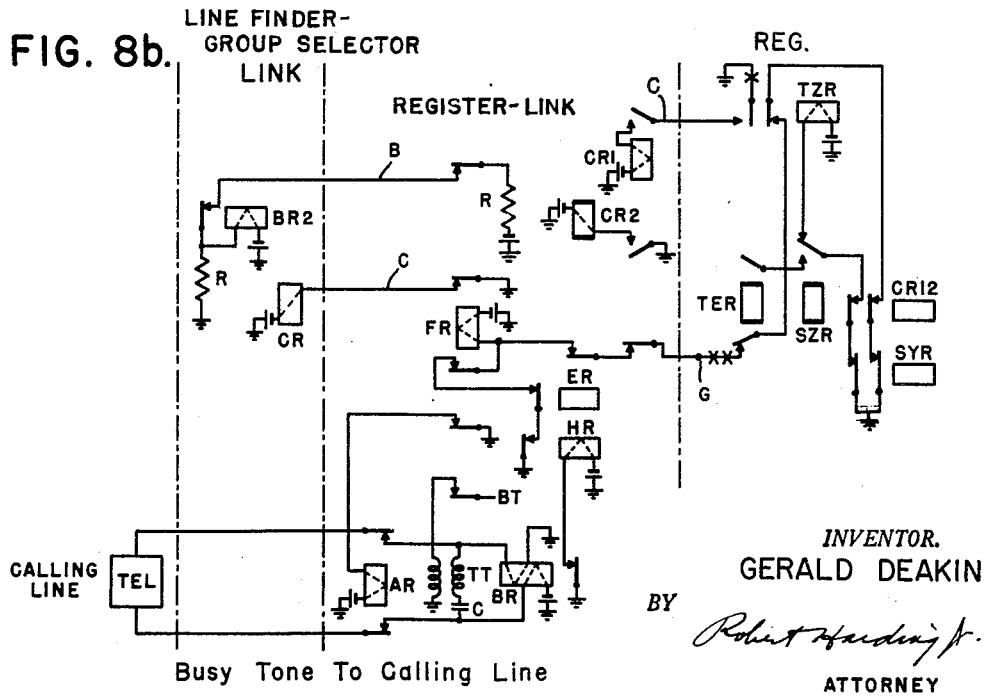

In the drawings the various features of the system constitute improvements on the system disclosed in my copending applications Serial No. 521,160, filed February 5, 1944, now U. S. Patent No. 2,484,080, granted November 11, 1949, Serial No. 532,142, filed April 21, 1944, now U. S. Patent No. 2,440,249, granted April 27, 1948, and the applications and patents referred to therein. The present disclosure will be limited to the elements necessary for the explanation of the improvements. In the drawings:

Fig. 1 is a diagrammatic explanation of the multi-potential fundamental or control circuit used in controlling the setting of the line finder and selector switches under the control of the register;

Figs. 2, 3, 4 and 5, when placed together so that Figs. 2 and 5 are side by side with Fig. 2 at the left, Fig. 3 below Fig. 2, and Fig. 4 to the left of Fig. 3, represent the pertinent elements of the register and the switching devices. The terminals indicated at the bottoms of Figs. 3 and 4 afford connection, respectively, to trunk pulse circuits for controlling step-by-step switches and to trunk pulse circuits for controlling universal switching systems—like the one disclosed herein. These pulse circuits are employed only when necessary, e. g. when the called line is located at a step-by-step or another universal switching exchange;

Fig. 6 illustrates the condition of the pertinent elements of the system when the first group selector is operated to perform the second test;

Figs. 7, 7a, 7b, and 7c illustrate the operations, particularly in the final selector and the register circuits, during the testing and ringing of the called line;

Figs. 8, 8a and 8b illustrate diagrammatically the conditions when the called line is busy.

The fundamental or control circuit of Fig. 1 may be divided into two sub-circuits: A circuit for triodes V1, V2 operating on matched negative potentials and a rectifier-relay TRR circuit operating on a positive potential. The two triodes may be provided within a single envelope, as shown, or they may be separate. The two sub-circuits are connected in multiple to the test brush TB of a hunting selector which may function either as a line finder or as a final selector. Whether the circuit responds to the matching of potentials or to positive potential is determined by the condition which is first met by the selector.

The tube circuit is symmetrical. The circuits for the grids and cathodes of the twin triodes V1—V2 include similar rectifier grid biasing units 1 and 2. The triode V1, with its rectifier grid biasing unit 1, shown on the left of Fig. 1 is connected to the register from which the marking potential is obtained and the right triode V2 with its rectifier grid biasing unit 2 is connected to the test brush TB. As the brush TB moves over the selector bank terminals the potentials designating the terminals are connected to the triode V2. The circuit comprises, in addition to the twin triode V1—V2 and rectifier grid biasing units 1—2 a commercial gas tube GV bridged by a resistor R6 and a small capacity condenser C1 to prevent false operation by transient voltages, a high-speed relay TVR, several radio-type resistors, and one small rheostat R9 for adjusting the potential across the primary windings of the biasing unit transformers to approximately 1.8 volts.

The rectifier unit 1 has a small transformer TT2, two small rectifiers S1 and S2, a commercial plug-in electrolytic condenser C2, and a radio-type resistor R7. The rectifier unit 2 has corresponding elements TT1, S3 and S4, C3 and R8. These are housed under a common cover and mounted on a radio-type plug-in socket. The tube circuit requires a source of 50- or 60-cycle alternating current at 6.2 volts for the filaments of the twin triodes and for the transformers of the biasing units, and a 145-volt direct-current source HTB for the plate and the gas tube circuits.

The circuit of relay TRR comprises a small rectifier S5 and a radio-type resistor R4.

*Operation of tube circuit*

To place the fundamental circuit in operation, the digit-storing relays, here represented by relay XRO which has been operated to record the dial pulses, place the required negative potential PDX on the grid bias unit 1 of V1 and on the cathode of V2. When a selection is to be made by the register, relays THTR and XBR are operated. Relay THTR places high-tension battery on the anodes of V1 and V2 and on one control electrode of the gas tube GV. Relay XBR closes the circuit of the selector magnet P over wire B thus causing the selector to hunt and drive its test brush TB over the bank test terminals T until the corresponding negative potential PD is found. When the potential found by the selector approximately equals potential applied by XRO, the grids of V1 and V2 become negative by approximately 1.8 volts (the output voltage of the grid rectifier bias units 1 and 2) with respect to their cathodes. Under this condition, the impedance of plate circuits in the twin triode is increased to such an extent as to allow the potential at the control grid of the gas tube GV to rise to breakdown value (65 to 80 volts) whereupon GV ionizes and current flows through relay TVR which opens the selector magnet circuit, stopping the selector on the selected terminal.

The normal minimum negative potentials E2 and E3 which will be matched have a value of 5–7 volts, producing a maximum firing potential for the gas tube of 115 volts. The maximum matched positive potentials E2 and E3 in normal operation may vary between 29 volts and 41 volts, producing a minimum firing potential of 93 volts. Positive firing is thus assured under all conditions. All potentials are obtained from the same source, not shown, so that corresponding potentials will always have the required relationship no matter how much they may vary from their normal value.

When the two negative potentials E2 and E3 differ by more than 1.5 volts, the impedance of that plate circuit in the twin triode whose grid is the least negative with respect to its cathode is decreased to such an extent as to cause the potential at the gas tube control electrode to fall below firing voltage. To illustrate an extreme case, when E2 is —3.4 volts and E3 —5.1 volts, the non-firing positive potential of E1 rises to a maximum of 51 volts, well below the minimum firing potential of 65 volts.

Potential E2 is always placed on the register side of the tube circuit before high-tension battery is connected by THTR. If this were not done, the potential E1 would rise to the firing value due to the connection of the rectifier-relay TRR to the selector brush.

The fundamental circuit permits continuous hunting until the proper negative potential is found. The negative potentials E3 at the test terminals T in the selector banks may be arranged in any order.

The greater the separation between the potentials E2 and E3, the lower the firing potential E1. In fact, E1 may become negative. A ground or a positive potential E3 on the test terminal will produce a resulting E1 which is always below firing value, or negative. GV fires on positive potentials only.

The rectifier S5 prevents a flow of current from the negative potential source connected to the T-terminals. A positive potential on the T-terminal will not operate the tube circuit, but when one of approximately 50 volts or more is encountered by the test brush TB, current flows through rectifier S5, resistor R4 and relay TRR to ground. The relay opens the selector magnet circuit in the same manner as TVR and stops the selector regardless of the functioning of the tube circuit.

*Operation of the system (Figs. 2–5)*

When a subscriber removes the handset at his substation 3, his line circuit operates the starting circuit 4 to cause all idle associated register links 5 (sometimes called R-links) to hunt for the available best choice line finder-group selector link 6 (sometimes called B-link). When one is picked up, the same register-link 5 chooses an idle register, whereupon the register causes the line finder 7 of the line finder-group selector-link to select the calling line 3 in the same manner as it subsequently causes the group and final selectors (Fig. 5) to extend the line finder-group selector-link 6 to the called line.

*Register checked for maximum non-firing voltage*

When an idle register is found a circuit is established from ground in the register-link circuit, the T wire, back R4R, front SER, winding SCR, back NAR, and contacts controlled by the counting relays 8 to battery. SER is normally operated by the closure of a switch in the register control circuit 10.

When a register is picked up, it is automatically checked before selection commences for non-firing on maximum non-firing voltage. At the end of selection, as described below, it is automatically checked for firing on minimum firing voltage. When a register fails on either of these tests, it is automatically placed out of service and a guard lamp GL is lighted.

When SCR operates, it energizes momentarily slow release relay SFR in a circuit from ground, back R2R, front SCR, winding SFR to battery. SFR places potential PDO over bias unit 2, on the grid of V2. The grid of VI is already connected to potential PDX over bias unit 1, back TCR2, back R5R, back SLR, over counting relays 8 to potential PDX applied in the first group of digit storing relays 9. This combination gives the highest non-firing voltage. SFR also closes the local connection of the B wire fundamental circuit from ground, front SFR, back TRR, back TVR, winding TAR, back TCR1, back TDR, back R5R, front SFR, resistor to battery. TAR operates and energizes THTR which places high-tension battery HTB on the tube circuit. If the tube circuit is in good condition, GV will not fire and consequently TVR will not operate. In due course SFR falls away when R2R breaks its back contact (as described below) and restores the tube circuit to normal.

Should GV fire and operate TVR during the brief interval that SFR is energized, a circuit is established from ground, front SFR, back TRR, front TVR, front SFR, winding SDR and key RLK to battery. The guard lamp GL operates in parallel with SDR. SDR locks up and opens the circuit of SER. When the circuit of SER is opened, the register-link 5 is released and permitted to search for another register. The faulty register is held out of service until corrected and released by the attendant.

Relay SCR when it first operates also operates register release relay R1R which in turn operates R2R which grounds the common leads throughout the register and releases SFR. R2R locks up SER so that should an attendant or automatic control prematurely open the operating circuit of SER at 10, the register will not be released until the selection is completed or until the calling subscriber hangs up.

The register now controls the operation of the line finder 7 to find the calling line 3, the identification of the calling line and the class of service to which it is entitled. The calling subscriber will then dial the numerical digits designating the called line and these will be received on the pulse selection and the rectifier or dial pulsing relays 11 and registered in the digit storing relays 9, 12, etc. under the control of the cascade relays 13, counting relays 8, and digit counting relays 14.

When the line finder 7 seizes the calling line 3 TVR in the tube circuit operates and energizes TFR1 causing NAR to pull up. NAR grounds the C and D terminals of the register-link 5 and consequently the line finder group-selector-link. When after the release of TVR, TFR1 breaks its front contacts, NAR is released which removes ground from register-link terminal D for the purpose of controlling the connection of the calling line with the line finder-group selector-link and of the latter with the register.

NAR in operating opens the T wire circuit of the register, thus releasing SCR. NAR energizes DBR associated with the pulsing relays 11 which holds R1R energized when NAR is released.

Register selects called line

FIRST GROUP SELECTOR OPERATES—FIRST TEST

As soon as the first digit is dialed, the B wire circuit is closed from ground, front XAR1 in the first group of digit-storing relays 9, the counting relay circuit 8, back TRR, back TVR, winding TAR, back TCR1, back TDR, back R5R, back SFR, wire B, the register-link, the line finder-group selector-link, contact PNC (Fig. 5), winding AR2 of the first group selector, to battery. AR2 locks up to the B wire and connects the clutch magnet P2.

TAR energizes THTR which places high-tension battery on the tube circuit. Potential has already been applied to the grid circuit of V1 from source PDX, front XRO of the first group of digit-storing relays 9, the counting relays 8, back SLR, back R5R, back TCR 2 to the grid of V1. The A wire of the fundamental circuit is connected to the grid of V2 over the register-link, the line finder-group selector-link, front AR2, front BR2 to brush T. This is the condition of the fundamental circuit when the first group selector starts hunting for an idle thousands selector (sometimes called "T-selector") having a potential PD on its T-terminal.

When the same potentials are applied to both grids, GV fires and energizes TVR which opens the B wire circuit, releasing TAR, TAR2 and AR2 and P2 of the first group selector. The first group selector comes to rest on the terminals of the selected thousands selector and TAR2 which is quick releasing grounds the A wire over THTR front and in the first group selector over AR2 and BR2 front to the T-brush, and makes the selected thousands-selector promptly busy to any other hunting first group selector. Shortly after this, AR2 reconnects the A, B, C and T-brushes to their normal circuits. The T-terminal remains grounded over front BR2, back AR2, to ground in the line finder-group selector-link.

TVR energizes TFR1 which energizes TCR1 (over a circuit not shown) and also the cascade relays.

In due course, THTR, released by TAR, removes the high-tension battery from the tube circuit and de-energizes TVR, whereupon TVR breaks its front contact and releases TFR1, after which TCR2 operates and locks up in series with TCR1 and re-energizes THTR which places high-tension battery on the tube circuit for the second time. TCR2 opens the circuit of the string of counting relays, and disconnects ground from one electrode of GV and in place thereof connects the electrode to the A wire of the fundamental circuit. TCR2 also removes ground from the back of TAR2 and thus from the A wire; this is necessary since TAR2 is not energized on the second test as the B wire circuit is open at a back contact of TCR1.

The various circuits are now ready for the second test.

SECOND TEST OF THOUSANDS-SELECTOR

The fundamental circuit at the start of the second test is diagrammatically shown in Fig. 6. When AR2 in the first group selector closes the A wire circuit, PD potential is again placed on the grid of V2. The circuit may be traced from potential PDX, off-normal contact of the thousands-selector, back BR3, A wire, A-brush of the first group selector, back AR2, A wire thence through the line finder-group selector and register link to the grid of V2. The grid of V1 remains connected to PDX in the counting relays, but this time over front TCR2 and front CCR1 of the cascade relays.

Thus GV fires the instant the second test commences and TVR operates for the second time. TFR1 energizes which energizes TDR and locks up CCR1. TDR, besides releasing TCR1, energizes counting relay CR3 over front CR2 (not shown) and back CR4. TDR also energizes the BR3 relay in the thousands group selector over a momentary circuit from battery, back CR3 (not shown), front CR2a (not shown), resistor R and TDR front to the B wire, thence over the line finder-group selector-link, back AR2, B-brush, back BR3, winding BR3, C-brush of the first group selector, back AR2, winding marginal low resistance HR to ground.

BR3 operates, disconnects itself from the B wire and locks up through a resistor to battery. On account of the high resistance of the C wire circuit, HR does not operate. BR3 disconnects the PD potential from the T and A wires. In a manner not shown in detail, BR3 extends the T wire through the T-brush over back AR3 and the B wire tot he B-brush of the thousands selector.

TDR removes ground from THTR which releases and removes high-tension battery from the tube circuit, after which TVR releases TFR1 which releases TCR2, TDR and CCR1. When TDR breaks its front contact, it removes shunt from CR4 which now locks up in series with CR3 and connects the tube circuit to the second group of digit-storing relays ready for the second selection.

As indicated in Fig. 5, the T-terminals of subscribers' lines have different negative, so-called "PD," potentials 1 to 10 applied thereto and the groups are separated by tens terminals having negative potentials PD11 to 15 and also terminals designated as N. E. positions (non-existing number positions) to which 50 volts positive potential is connected.

The register then operates in succession the thousands and hundreds selectors, the latter to select an idle final selector.

*Final-selector and its bank (Fig. 5)*

The final-selector is an eight-brush switch, the first set of four brushes cooperating with the upper and the second set with the lower half of the terminal bank. The choice between the two brush sets and thus between the upper and the lower half of the bank is made by relay DR (Fig. 5). The relay normally connects the upper brushes to the circuit and when operated connects the lower brushes and disconnects the upper. This plan is used to reduce the selection time of the normally most distant tens. In effect, the number of tens-position selections is reduced from ten to five and the average hunt reduced accordingly. Lines 10 to 59 occupy the upper half of the bank and lines 60 to 09 the lower half.

*Final-selector selects tens digit*

The final-selector selects the tens digit of the called number under the control of the fourth group of digit-storing relays (not shown) in the usual way, with two exceptions:

First, there is an additional prior operation to energize the DR relay in the final-selector circuit which transfers the circuit connection from the upper set of brushes to the lower set if the 60 to zero group of tens is called. This prior operation consists of grounding of the A wire over a circuit from ground applied in a manner not shown over the counting relays and the fourth group of digit-storing relays back THTR to the A wire, the first, thousands and hundreds selectors, ONC4 of the final-selector, front BR4, back DR, winding DR to battery. DR locks up to the C wire which is grounded by the C-brush and back AR3 of the hundreds-selector to ground. When the tens digit is 1 to 5, the corresponding relay in the fourth group of digit-storing relays opens this prior grounding circuit, so that DR in the final is energized only when the tens digit is 6 to 0. In the units position, a counting relay opens this circuit.

The second departure from the normal operation is that when the B wire is grounded by the register, a circuit is closed at the final from ground on the B wire, back CR, back AR4, low resistance winding of AR4, front BR4, contact ONC1, low resistance resistor R to battery. AR4 operates and connects its normal holding winding and P4 to the B wire, opening at the same time the low resistance operating circuit. This permits AR4 to be re-energized, as explained below, when the selector stops in a tens position, in which ONC1 transfers the connection of the low resistance winding from resistor R to brush C of the final selector.

When the final clutch magnet P4 is energized and the selector passes out of its home position, contact ONC4 breaks its connection with BR4 front and connects the A wire to the front contact of AR4 and therethrough to the T-brush over DR back. THTR in the register breaks its back contact before the brushes of the final-selector make contact with the bank terminals so that potential PD11 which is on the tens position T-terminal of the zero or first tens position (depending whether the upper or lower half of the bank is used), will not be grounded. The corresponding potential is applied to the grid of V1 from the fourth group of digit-storing relays, over the counting relays and back TCR2.

When, therefore, the final T-brush makes contact with the T-terminal of the 1 or zero tens positions which are the first positions in the upper and lower halves, GV fires in the usual way, energizing TVR which releases TAR, TAR2 in the register, and AR4 and P4 stopping the final-selector.

TVR energizes TFR1 which energizes TDR over a circuit (not shown) controlled by the counting relays. TDR energizes a counting relay and in due course THTR falls away and de-energizes TVR which releases TDR, thus removing the short-circuiting ground of the counting relays thus transferring the tube circuit to the control of the fifth group of digit-storing relays (not shown) without a second test.

The tens position is common to all finals and more than one may stop on the same position at the same time. To permit this, ground is removed from the armature of TAR2 in the counting relays so that the T-terminal of the final will not be made momentarily busy when TAR2 releases. It is to be noted in this connection that the *t* wire from the hundreds-selector is not connected through to the final-selector T-brush.

*Final-selector selects units digit—first test*

When the counting relays transfer control of the connection to the fifth group of digit-storing relays, the B wire is grounded and potential PDX is placed on the grid of V1, all in the usual way.

The ground on the B wire is extended over the group selectors to the final-selector (Fig. 5), back CR, back and low resistance winding of AR4, front BR4, ONC1, front DR, brush C, terminal C of tens position, low resistance resistor R to battery. AR4 operates, locks up to the B wire and disconnects its low resistance winding, just as during the tens selection.

The final-selector hunts for a called line having the dialed potential, e. g. the PDX terminal on the T-terminal which is now connected to the A wire and consequently to the grid of V2 in the register, GV fires and TVR operates. TAR, TAR2 in the register and AR4 and P4 in the final-selector are released and the final comes to rest on the terminals of the called line, whether free or busy.

TVR energizes TFR1 which energizes TDR over a circuit (not shown) controlled by the counting relays. TDR energizes certain counting relays. When THTR breaks its front contacts and releases TVR, TFR1 falls away and the counting relays operate in the usual way so that the B wire circuit will not be closed over back TRR and TVR. THTR is not energized and the tube circuit remains dead.

Second test—called line free

The counting relays close a circuit from ground, high and low resistance windings of TBR (Fig. 7), to the A wire, and through the register link, line finder-group selector link, first group selector (Fig. 5), thousands selector, hundreds selector, and thence in the final-selector, ONC4, back AR4, back CR, lower winding of CR, back DR, brush C, winding COR (Fig. 7) of the called line to battery. If the line is free, TBR is not shunted by a BR-relay of some busying final or some finder circuit (see Fig. 8). Thus TBR operates and shunts its high resistance winding by its low resistance winding, thereby energizing CR in the final in series with the called line cut-off relay (see Fig. 7). CR locks up (see Fig. 5) over a circuit from ground, ONC2 which is closed when the F-selector is off normal, upper winding and front CR, resistor R to battery. CR disconnects the operating windings of itself and AR4, and in place thereof connects the A and B wires to the A and B-brushes over front or back DR.

Figure 7:
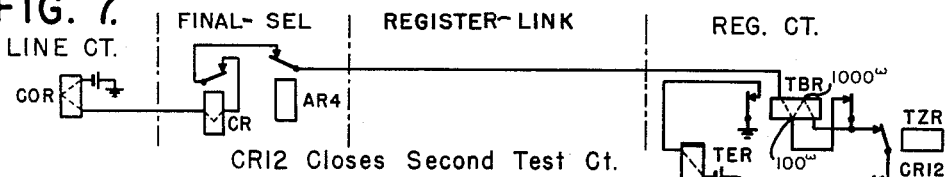
Figure 7A:
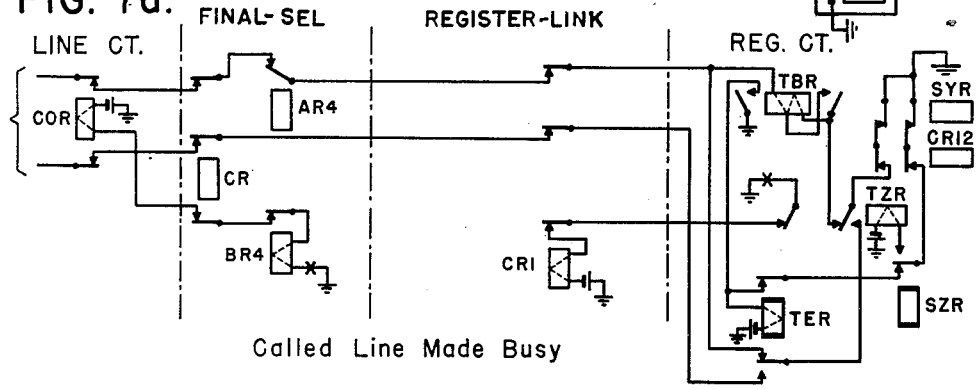

Before CR breaks its back contact, it closes a circuit from ground, back AR3 in the hundreds-selector (Fig. 5), C-brush of hundreds-selector, winding and front BR4, front CR, back or front DR, C-brush of final-selector, winding COR to battery. Immediately after this, the C-brush and the second winding of CR are disconnected from the A wire in the top back contact of CR. The called line cut-off relay COR and BR4 of the final-selector are now held at ground on AR3 back under the control of the hundreds-selector (Fig. 7a). COR disconnects the called line relay from the A and B wires of the line and in place thereof connects the line to the A and B terminals in the final and line finder banks. The instant CR in the final operates (see Fig. 7), it releases TBR in the register but not before TBR has energized TER which locks up over the counting relays. The circuit at this stage is shown in Fig. 7a.

Called line rung

Figure 7B:
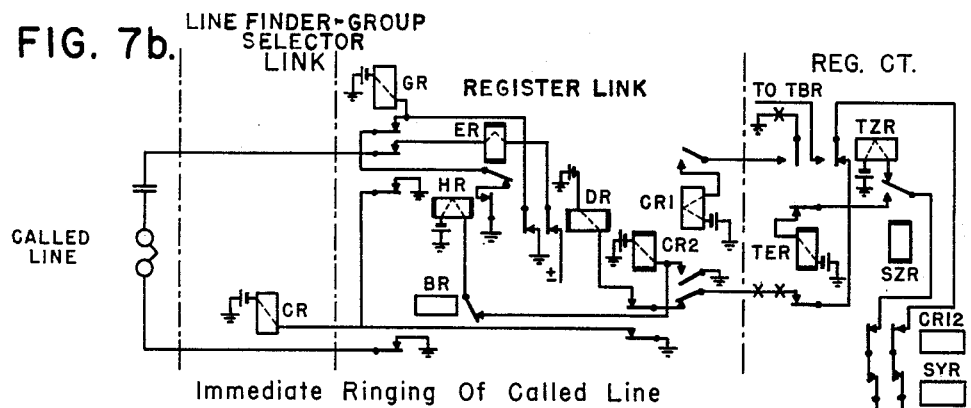
Figure 7C:
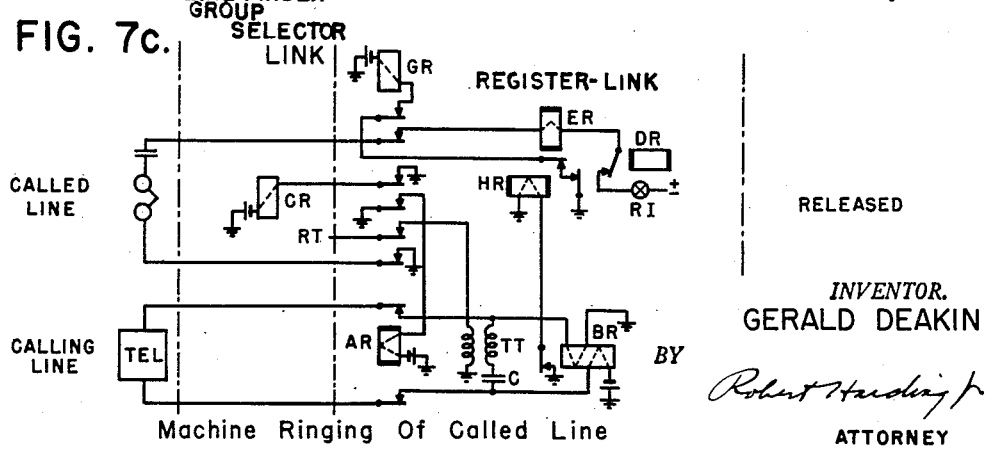

This is shown in Figs. 7b and 7c. In due course SZR in the register makes its back contact and in so doing energizes TZR, circuit from ground, back SYR, front CR12, back SZR, winding TZR to battery. TER is slow releasing and remains on its front contact. TZR opens the C wire of the register and releases CR1 of the register-link. CR1 opens the circuit of CR2 which is slow releasing. A circuit is now established from back SYR, front CR12, front TZR and TER, back CR1, front CR2, winding DR to battery. DR energizes GR and an initial ring is given to the subscriber's line from ringing current, front DR, winding marginal ringing release relay ER, front GR, through the train of selectors, the called line, back over the B wire, front GR to ground. GR energizes AR in the register-link (Fig. 7c) which bridges BR in the register-link across the calling line. BR operates in multiple with the register pulsing relays (Fig. 4) and retains slow release relay HR which was initially energized by CR1. GR locks up over front HR and back ER and connects the ringing tone RT to the primary of the transformer TT to the calling subscriber. Finally, GR grounds the C wire of the line finder-group selector-link to hold it. In due course, CR2 breaks its front contacts and DR which is slow releasing transfers ringing current to the machine ringing interrupter RI. The register-link remains in this condition until the called subscriber answers (see Fig. 7c).

Second test—called line busy

Attention is called to Figs. 8–8b. Should the called line be busy, the cut-off relay of the called line will be energized in series with some final BR4-relay or a line finder BR-relay. In either case, the shunting effect of such BR relay to ground prevents the energization of TBR in the register when CR12 of the counting relays makes its front contact (Fig. 8). TER and CR are not energized (Fig. 8a).

Calling subscriber receives busy tone and first group selector releases (Fig. 8b)

When SZR makes its back contact and energizes TZR, CR1 of the register-link releases and a circuit is established from ground, back SYR, front CR12, front TZR, back TER, control relays (not shown) in the register, the G-terminal of the register-link, back CR1, front CR2, winding FR to battery. FR operates AR which energizes BR. FR locks up over front contact of HR and back ER, and connects the busy tone BT to the primary of the transformer TT and thus to the calling subscriber. FR holds the line finder-group selector-link by grounding the C-wire of that link but releases the established connection beyond the first group selector by placing battery through a low resistance on the B wire of the line finder-group selector-link which shunts out and unlocks the BR2-relay of that link. When BR2 makes its back contact, it energizes a relay (not shown) which opens the A, B and C-brush connections and energizes P2 (Fig. 5). The T-brush connection is open at front BR2 in the line finder-group selector-link. The first group selector returns to its home position.

Register released and checked for minimum firing voltage

When CR2 in the register-link breaks its front contacts (Fig. 8b), it disconnects the register. The details of this are not shown; for the present purpose it suffices to know that shortly after the circuit of slow release relay DBR (Fig. 4) is opened, R1R (Fig. 3) releases R3R which, being slow releasing, establishes a momentary circuit from ground, back R1R, front R3R, winding R4R, back SDR to battery. R4R energizes R5R which places potential PD19 on the grids of V1 and V2, at the same time closing a circuit from ground, front 5R, back TRR (Fig. 2), back TVR, winding TAR, back TCR1, back TDR, front R5R (Fig. 3), resistor to battery. TAR energizes THTR which places high-tension battery on the tube circuit. In case the tube circuit is in condition to operate on the minimum firing voltage, GV fires and energizes TVR which removes ground from the armature of R4R (its locking circuit) so that when R3R breaks its front contact R4R releases promptly and SDR will not become energized. R4R release R5R. R2R which is released by R1R removes ground from the various locked up relays throughout the register circuit.

Should GV fail to fire and operate TVR before R3R makes its back contact, R4R will remain locked up over back SDR and front R4R, and a circuit will be established from back R1R, back R3R, front R4R, winding SDR, key RLK to battery. SDR locks up and the guard lamp GL lights, and SDR releases R4R and opens the circuit of relay SER so that the register may not again be picked up until the fault is corrected and SDR released by the attendant who does this by operating the release key RLK. R4R releases R5R.

When the called party answers, the register-link is released. Upon the termination of the conversation, the selectors are released.

*Called subscriber answers—register-link released*

When the called subscriber answers, marginal relay ER in the register-link (Fig. 7c) breaks its back contact and releases GR which disconnects ringing current from the called line. AR releases and disconnects BR from the calling line whereupon HR releases. GR also removes ground from the C-brush which releases the line finder-group selector-link under the control of CR. The normal transmission bridge through supervisory relays (not shown) will now be connected to the calling and called lines, respectively, before AR which is slightly slow releasing disconnects BR from the calling line. Thus, the transfer is made without an objectionable click.

*Calling subscriber hangs up on no-answer or "busy"—register and line finder-group selector-links released*

Whether the calling subscriber hangs up on a busy call or on a no-answer call, BR (Fig. 7c) releases HR which releases GR. Ground is removed from the C-brush of the line finder-group selector-link and AR is then released.

CR of the B-link is released but as the calling line is now open, the supervisory relay is not energized and in due course the line finder is returned to its home position in the same manner as the first group selector. The circuit is now in condition to receive a second call.

*P. B. X groups*

P. B. X groups are formed by gixing all lines in a group the same PD-potential and by arranging all lines in the group except the last so as to remove the PD-potential when the line is busy, i. e. when the cut-off relay is operated, thereby causing the final to hunt for a free line. The last line in each P. B. X group is arranged as a main or ordinary line so that when all lines in a group are busy, the calling final selector will come to rest on the last line in the usual way and the calling subscriber will receive the usual busy tone.

*P. B. X night service*

In those cases where it is desirable to call the individual lines in a P. B. X group by their normal numbers during night hours or holidays, a night service relay is connected in multiple with the cut-off relay of the second calling line in the P. B. X group. The first and second lines will always have the P. B. X number but the remaining lines in the group will have their normal numbers until an associated relay is energized, after which all lines receive the P. B. X PD-potential. By connecting this relay to the second P. B. X line, the P. B. X may still receive one call without removing the individual line potentials from all lines beyond the second. It is assumed that the directory will contain the usual instructions regarding night service when the P. B. X is closed.

*Subscriber calls a non-existing last digit*

Should a subscriber call an individual P. B. X line during the daytime when all potentials have been changed to P. B. X potential, or a disconnected line in a main line group (to disconnect a line one simply removes the PD-potential), the final will pass over the group of ten lines and come to rest on the following NE (non-existing number) position, in which the T-terminal is always connected to +50 volts (Fig. 5). When the T-brush of the final makes contact with this terminal, relay TRR (Fig. 2) in the register circuit operates ( it is connected to ground over a front contact of a counting relay) and energizes TFR2 in series with TFR1. TFR2 is quick acting and prepares circuits (not shown) so that when TFR1 makes its front contact, TDR will not be energized as it is when TVR operates. TFR1 operates TCR1 (Fig. 6).

TRR (Fig. 2) opens the B wire circuit and the final comes to rest on the terminals of the NE-position. AR4 (Fig. 5) releases and connects the C-brush to the A wire. TFR3 (Fig. 6) grounds the A wire which shunts out TRR (Fig. 2) whereby TFR1 releases and CR (Fig. 5) of the final energizes to connect the A-brush through to the A-terminal of the NE-position. Unlike the A-terminal of an NE-position shown in Fig. 5, the one belonging to an ordinary NE position is not connected to any PS-potential. The cascade relays 13 will, therefore, fall off in turn when TCR2 operates, which it does when TFR1 breaks its front contact and a circuit (not shown) will be established, to open the locking grounds of all counting relays except CR1 and CR2. TCR1 and TCR2 will be unlocked and the B wire grounded to shunt out relay BR2 (Fig. 8b) of the B-link which releases the train of selectors.

*Calls automatically sent to intercepting operator*

Since the digit storing relays are not released, ground is placed on the back contact of counting relay CR4 (Fig. 6) and when the first group selector reaches its home position, the B wire circuit is again closed and the group selector again starts hunting, this time for the potential PDY which is placed on the back contact of CR3 by SWR. This potential is connected to terminals of trunks leading to special service second group selectors and when one is found, counting relays CR3 and CR4 operate in the usual way and the B wire circuit is again closed, to operate the special service second group selector to select the intercepting operator. TZR opens the C wire and releases CR1 (Figs. 8a and b) of the register-link and since CR12 is not energized, neither DR nor GR (Fig. 7b) of the register-link is operated. Thus when CR2 breaks its front contact, the register-link and register are released and the C wire to the line finder-group selector-link is opened (Fig. 7b). CR of the line finder-group selector-link releases and connects that link through a local trunk to the intercepting operator.

*Calling and called subscribers hang up*

When both subscribers hang up at substantially the same time, the supervisory relays release the line finder, the first group selector and the train of selectors beyond.

*Calling subscriber hangs up but not called subscriber*

When the calling subscriber hangs up, the first group selector and the train beyond are not immediately released, but are held over a timed alarm relay (not shown) which delays the release for 5-10 seconds. This will cause, in the usual manner, the initiation of a call by the called subscriber. The call comes in as a false call on a permanent loop on the switchroom attendant's desk, making it unnecessary to trace down permanent loops at the final selectors.

*Called subscriber hangs up but not the calling subscriber*

When the called subscriber hangs up, the timed alarm circuit (not shown) commences to operate, and if the calling subscriber does not hang up within 20 to 40 seconds or so, the call comes in as a permanent loop on a false call circuit.

*False calls or slow dialing*

When the register is picked up by a calling line, a circuit is established through an interrupter (not shown) to close a circuit every 20 seconds so that should the calling line be a permanent loop or should the calling subscriber fail to dial successive digits within 0 to 20 seconds of each other, SPR (not shown) operates any and all counting relays beyond CR1, and CR2 will be unlocked and any partially established connection broken down. Ground will be applied over the back of CR4 to the B wire circuit and potential PDX placed on the back of CR3 (Fig. 6). Thus the first group selector will automatically select an idle trunk with potential PDX on the T-terminal, and trunks with this particular potential will terminate on the false call position in the switchroom.

When selection is complete and CR3 and CR4 operate, TZR (Fig. 8b) is energized. The register and register-link are released and the line finder-group selector-link is connected to the false call trunk.

Any other available PD-potential could be assigned to the false call trunk.

*Call to an X-line*

An X-line is a supplementary line reached over a supplementary group of selector switches when no usable space exists in the final bank for an additional line or lines. A call to a free normal line or lines is completed in the usual way. When all normal lines are busy, the PD-potential is removed and the final proceeds to the following NE-position (Fig. 5) which causes the connection to be broken down and then automatically re-established under the control of the register controller with an extra selection introduced by a special service second group selector, after which the last four digits are repeated over an appropriate new string of thousands, hundreds, and final selectors. These operations are performed in the same manner as the routing of a call to an operator when a non-existent number is dialed. The connections between the supplementary thousands, hundreds, and final selector banks is flexible so that only those switches are connected which are needed for X-lines. On account of the flexibility of the cross-connections, the same final may choose different numbers in different thousands and hundreds when the last two or three digits are not the same and do not interfere, and the same thousands, hundreds, and final selectors may handle a variety of 100 numbers when the digits do not interfere. One example is the following:

$$\left.\begin{array}{cccc} 1 & 6 & 2 & 1 \\ 5 & 5 & 2 & 2 \\ 2 & 4 & 2 & 3 \\ 7 & 8 & 2 & 4 \\ 3 & 2 & 2 & 5 \\ 4 & 1 & 2 & 6 \\ 9 & 3 & 2 & 7 \\ 8 & 0 & 2 & 8 \\ 0 & 7 & 2 & 9 \\ 6 & 8 & 2 & 0 \end{array}\right\} \text{All served by same thousands, hundreds, and final selectors.}$$

To accomplish this, the A-terminals A' of the NE-position following the group of ten lines with which the X-line or lines are associated has a predetermined potential, e. g. PS12 connected to it (see Fig. 5), whereas the A-terminals of the normal NE-positions are free. When the final finds the main line or all lines of the P. B. X group having X-lines busy, it passes onto and stops on the NE-position in the usual way. CR is energized and the cascade relays 13 (Figs. 4 and 6) in the register commence to release. The A-brush of the final is connected through to the grid of V2 and places potential PS12 on it. When certain cascade relays, including CCR1, make their back contacts, potential PS12 is placed on the grid of V1 over front TCR2. GV fires and operates TVR which energizes TFR1, whereupon all counting relays beyond CR1 and CR2 as well as the first group selector and the train of selectors beyond are released.

THTR releases TVR which releases TFR1 which releases TDR and the cascade relays. The digit-storing relays remain energized, and the connection is re-established as soon as the first group selector reaches its home position but the counting relays will not become locked up. Thus, the first group selector selects a special service second group selector having potential PDY on the T-terminal, after which the remainder of the selection is completed in accordance with the number originally dialed.

What is claimed is:

1. In a switching system, a multi-electrode discharge device, sources of different potentials, a first circuit for applying a predetermined source of potential to one electrode of the device, a switch having a wiper and a plurality of cooperating contacts, means for connecting said sources with said contacts, a magnet for controlling the wiper of said switch, a second circuit for connecting said wiper of said switch with another electrode of said device, a first relay operated when the potentials applied to said device by the first and second circuits bear a predetermined relationship to one another, a second relay having its winding connected with said second circuit and responsive to a certain potential, and a circuit for said magnet controlled by both said relays.

2. In a switching system, a multi-electrode discharge device, sources of different direct potentials of one polarity, a first circuit for applying a predetermined source of potential to one electrode of the device, a switch having a wiper and a plurality of cooperating contacts, means for connecting said sources with said contacts, a magnet for controlling the wiper of said switch, a second circuit for connecting said contacts with another electrode of said device, a first relay operated when the potentials of said one polarity applied to said device by the first and second circuits bear predetermined relationships to one another, a second relay, a third circuit polarized to respond only to potentials of the opposite polarity to said one polarity for connecting the winding of said second relay with said second circuit, and a circuit for said magnet controlled by both said relays.

3. In a telephone exchange system, a plurality of lines, selectors for connecting a calling with a called line, a register for controlling said selectors and comprising a multi-electrode discharge device, sources of different potentials, a first circuit in the register for applying a predetermined one of said sources of potential to one electrode of the device, means for connecting said sources with the terminal of said selector, a magnet for controlling said selector, a second circuit for connecting said selecter with another electrode of said device, a first relay in the register means for operating said first relay when the potentials applied to said device by the first and second circuits bear predetermined relationships to one another, a second relay in the register having a winding connected with said second circuit and responsive to a certain potential, and a circuit for said magnet controlled by both said relays.

4. In a telephone system, a plurality of lines, selectors for connecting a calling with a called line, a register for controlling said selectors and comprising a discharge device having a plurality of electrodes, sources of different direct potentials, a first circuit for applying a predetermined one of said sources of potential to one electrode, said selector having a wiper and cooperating contacts, means for connecting different sources with said bank contacts, a magnet for controlling the movement of said wiper, a second circuit for connecting said contacts with another electrode, a first relay, means for operating said first relay only when the potentials applied to said device by the first and second circuits are of a certain polarity and bear a predetermined relationship to one another, a second relay having a winding connected with said second circuit, means in the last-mentioned connection allowing operation of the second relay only when a potential of the opposite polarity from said certain polarity is applied to the second circuit, and a circuit for said magnet controlled by both said relays.

5. In a switching system, a detector comprising a pair of trides and a gas valve, sources of different direct potentials, a first circuit for applying a predetermined one of said sources of potentials to the grid of the first triode and the cathode of the second triode, a switch having terminals and a wiper cooperating therewith, means for connecting different sources with said terminals, a magnet for controlling the movement of said wiper with respect to said terminals, a second circuit for connecting said wiper with the grid of the second triode and the cathode of the first triode, a circuit connecting said triodes with said gas valve for operating said gas valve only when the potentials of the same predetermined polarity and voltage are applied to said triodes by the first and second circuits, a first electromagnetic relay controlled by said gas valve, a second electromagnetic relay having a winding connected with said second circuit, a rectifier in the last-mentioned connection allowing response of the second relay only when a potential of a predetermined polarity is applied to the second circuit, and a circuit for said magnet including back contacts of both said relays.

6. A system according to claim 5 and in which the first and second circuits are connected to the triodes through biasing units, each biasing unit comprising a transformer having a secondary whose mid-point is connected with the grid of the associated triode, the end of the secondary winding being connected to the cathode of the other triode through a rectifier, a resistance and capacitance in parallel with said rectifier bridged across the mid-point of the transformer secondary and said associated circuit, and a source of alternating current supply connected with the transformer primary and with the filaments of both triodes, the rectifiers of said biasing units being similarly poled.

7. In a switching system, the combination according to claim 5, in which the terminals of the switch are divided into groups, each terminal in a group having a different negative potential connected thereto, and terminals separating said groups to which a certain positive potential is connected.

8. In a switching system, the combination according to claim 5, in which the switch has a terminal bank in which sets of terminals are arranged in groups spaced by terminal sets, each of said sets comprising talking and test terminals, different negative potentials being connected to each test terminal of the group and a predetermined positive potential to one of the talking terminals of at least one of the sets spacing two groups.

9. In a telephone system, a plurality of lines, means including a selector for connecting a calling with a called line, a register for controlling the selectors and comprising a detector comprising a pair of triodes and a gas valve, sources of different direct potentials, a first circuit for applying a predetermined one of said sources of potentials to the grid of the first triode and the cathode of the second triode, said selector having terminals and a wiper cooperating therewith, means for connecting different ones of said sources with said terminals, a magnet for controlling the movement of said wiper with respect to said terminals, a second circuit for connecting said wiper with the grid of the second triode and the cathode of the first triode, a circuit connecting said triodes with said gas valve for operating said gas valve only when the potentials of the same predetermined polarity and voltage are applied to said triodes by the first and second circuits, a first electromagnetic relay in the register controlled by said gas valve, a second electromagnetic relay in the register having its winding connected with said second circuit, a rectifier in the last-mentioned connection allowing response of the second relay only when a potential of a predetermined polarity is applied to the second circuit, and a circuit for said magnet including back contacts of both said relays.

10. In a telephone system, the combination, according to claim 9, in which the first and second circuits are connected to the triodes through biasing units, each biasing unit comprising a transformer having a secondary whose mid-point is connected with the grid of the associated triode, the end of the secondary winding being connected to the associated circuit and to the cathode of the other triode through a rectifier, a resistance and capacitance in parallel with said rectifier bridged across the mid-point of the transformer secondary and said circuit, a source of alternating current supply in the register connected with the transformer primary and with the filaments of both triodes, the rectifiers in said biasing units being similarly poled.

11. In a telephone system, the combination according to claim 9, in which the selector is a final selector whose terminals are divided into groups, each terminal in a group having a different negative potential connected thereto, and terminals separating said groups to which a certain positive potential is connected.

12. In a telephone exchange system, a plurality of lines, means including a group of final selectors for connecting a calling with a called line, each final selector having a bank of terminals consisting of sets of two talking, a control, and a test terminal for each line, a set of wipers and a magnet for controlling the movement of the wipers over said terminals, talking, test, and control conductors leading to said terminals and wipers, three relays for each final selector, the first one of said relays having a winding for operating the relay over the second talking conductor and the control conductor, the second relay having an energizing winding connected with the first talking conductor and having its circuit completed over contacts of the first and third relays, a circuit including the selector magnet for locking the second relay and operating the selector magnet over said first talking conductor including a contact of the first relay, a plurality of sources of different direct current potentials, means including a register for controlling the setting of the final selector in accordance with the numerical designation of the called line, a detector in said register having two input circuits, means controllable by the calling subscriber for applying different potentials to one of the detector input circuits depending on the numerical designation of the called line, means for connecting the other input circuit of the detector to said second talking conductor, means for operating said detector when two direct current potentials are applied to the input circuits thereof bearing a predetermined relationship to one another, a test relay in the register operated when the detector operates, a circuit in the register for controlling the operation of the final selector second relay and magnet controlled by the last mentioned relay, a connection to the test terminal of each line from one of said sources representing the designation of the line, a resistance for each line connected to the control terminal thereof in the final selector, a connection from the test wiper of each final selector to the second talking conductor including a contact of the second relay, and a locking circuit for the third relay to maintain the connection of the talking and line conductors to the called line through the wipers of the final selector.

13. In a telephone system, the combination according to claim 12, further comprising a polarized circuit in the register connected to the second talking conductor and responsive to potentials applied to the second talking conductor, and a relay in the register controlled over said polarized circuit and controlling the magnet circuit.

14. In a telephone system, the combination, according to claim 12, and in which each final selector has a terminal bank divided into two groups and two sets of wipers each adapted to cooperate with a different group, a fourth relay in each final selector having back contacts for connecting one set of wipers with the conductors leading to the final selector wipers and front contacts for connecting the other set of wipers with said conductors, and an energizing circuit for said fourth relay controlled by the third relay.

15. In a telephone system, the combination, according to claim 12, and in which the terminal bank is divided into groups of units terminals separated by a set of terminals representing a tens digit and a set of special terminals, characteristic potentials being connected to the units test terminals of a group and a different potential being connected to each tens test terminal.

16. In a telephone system, the combination, according to claim 12, and in which the terminal bank is divided into groups of units terminals separated by a set of terminals representing a tens digit and a set of special terminals, characteristic potentials being connected to the units test terminals of a group and a different potential being connected to each tens test terminal, connections from a source to all the control terminals, the last-mentioned connections to the units and the control terminals of the special terminals each including a resistance of a certain value and the last-mentioned connections to the tens control terminals resistances of different value.

17. In a telephone system, the combination, according to claim 12, and in which the terminal bank is divided into groups of units terminals separated by a set of terminals representing a tens digit and a set of special terminals, characteristic potentials being connected to the units test terminals of a group and a different potential being connected to each tens test terminal, connections from a source to all the control terminals, the last-mentioned connections to the units and the control terminals of the special terminals each including a resistance of a certain value and the last-mentioned connections to the tens control terminals resistances of different value, connections from a source to the test terminals of the special set arranged to give the test terminals potentials of opposite polarity to the potentials of the other test terminals, the last-mentioned connections including resistances of said certain value, and a relay in the register responsive to the application of potentials over the last-mentioned connections and controlling the selector magnet.

18. In a telephone system, the combination, according to claim 12, in which each final selector has a terminal bank divided into two groups and two sets of wipers each adapted to cooperate with a different group, a fourth relay in each final selector having back contacts for connecting one set of wipers with the conductors leading to the final selector wipers and front contacts for connecting the other set of wipers with said conductors, an energizing circuit for said fourth relay including a back contact thereof, a front contact of the third relay and the second talking conductor, and a locking circuit for the fourth relay including the control conductor leading to the hundreds selector wipers.

19. In a telephone exchange system, a plurality of lines, means including a group of numerical selectors for connecting a calling to a called line, each selector having sets of terminals and a set of wipers cooperating therewith in which talking, control and test conductors terminate, a magnet for each selector for controlling the movement of its wipers over the terminals, a holding relay in each selector operable over the conductor leading to the control wiper, sources of different potentials, a register for controlling the operation of said selector magnets and comprising a detector having two input circuits operable when two potentials are connected thereto which have a predetermined relationship to one another, means controlled by the calling line for applying to the detector a potential corresponding to a digit of the called number, connections controlled by the holding relays for connecting to a talking and the test conductors of the associated selector wiper one of said sources which represents the digit designating the selector, and means in the register effective over a talking conductor for altering said potential applied to the test wire upon the operation of said detector.

20. In a telephone system, the combination, according to claim 19, and in which the last mentioned means is a relay deenergized upon the operation of the detector to alter said potential.

21. In a telephone system, the combination, according to claim 19, in which the magnet circuit includes one of the talking conductor, and means is provided for employing the other talking conductor for connecting the sources of potential from the selector to the detector and from the register to alter the potential on the test wire.

22. In a telephone system, the combination, according to claim 19, further comprising a polarized circuit in the register connected to a talking conductor and responsive to certain potentials applied from the selectors.

23. In an automatic telephone exchange system, a plurality of lines, a plurality of normally inactive registers, means operable upon the initiation of a call on a line for taking into use an inactive register, means including selectors adapted to be controlled by the register taken into use for establishing a connection between a calling and a called line, means for releasing the register employed upon the establishment of said connection, a detector in each register comprising multi-electrode discharge devices, sources of different direct current potentials, a first circuit for connecting different potentials from said sources to the detector depending on the selecting operations desired, a magnet for controlling each selector, a second circuit for successively connecting different potentials from said sources to said detector over the selector, a third circuit, means for controlling the selector magnet over said third circuit only when the difference between the potentials applied to the detector from the first and second circuits varies between a predetermined maximum and minimum, a fourth circuit, a source of high potential, means operative upon each closure of the third circuit for closing said fourth circuit to apply a high potential from said source of high potential to the detector, means operative when the register is taken into use for applying to the first and second circuits potentials from said sources the difference between which exceeds said maximum, local means in each register and operative when it is taken into use for closing the fourth circuit, and means responsive to the operation of the two last mentioned means for disconnecting the register taken into use and replacing it with another register.

24. In an automatic telephone exchange system, the combination, according to claim 23, further comprising means operated upon the initiation of the release of the register employed in the establishment of the connection for applying the same potential from said sources to the first and second circuits and for operating said local means to close the fourth circuit, and means operative thereupon for completely releasing the register if the detector operates and for preventing the taking into use of the register for another call if the detector fails to operate.

25. In an automatic telephone exchange system, a plurality of lines, means including a plurality of normally inactive registers, means operable upon the initiation of a call on a line for taking into use an inactive register, and selectors adapted to be controlled by the register so taken into use for establishing a connection between a calling and a called line, means for releasing the register employed upon the establishment of said connection, a detector in each register comprising a pair of triodes and a gas valve, sources of different direct current potentials, a first circuit for applying different potentials from said sources to the grid of one triode and the cathode of the other triode, said potentials being chosen depending on the called number and other selecting operations desired, terminals and a cooperating wiper for each selector, means for connecting said sources with said terminals, a magnet for controlling the movement of each selector wiper with respect to said terminals, a second circuit for successively connecting the selector wipers with the grid of the second triode and the cathode of the first triode, a circuit for operating said gas valve only when the difference between the potentials applied to the first and second circuits varies between a predetermined maximum and minimum, an electromagnetic relay controlled by said gas valve, a third circuit successively extended to the magnets of the selectors under control including back contacts of said relay, a fourth circuit, means operative upon each closure of the third circuit for closing said fourth circuit to apply the source of highest potential to the anodes of the triodes and the gas tube, means operative when the register is taken into use for applying to the first and second circuits potentials from said sources the difference between which is equal to the maximum non-firing potential of said gas valve, local means in each register and operative when it is taken into use for closing the fourth circuit, and means responsive to the operation of the two last mentioned means for disconnecting the register taken into use and replacing it with another inactive one of said registers.

26. In an automatic telephone exchange system, the combination, according to claim 25, further comprising means operative upon the initiation of the release of the register employed in the establishment of the connection for applying from said sources the minimum firing potential for said gas valves to the first and second circuits and for operating said local means to close the fourth circuit, and means operative thereupon for completely releasing the register if the gas valve operates and for preventing the taking into use of the register for another call if the gas valve fails to operate.

27. In a telephone exchange system, a plurality of lines, means including a group of final selectors for connecting a calling with a called line, each final selector having sets of two talking, a control and a test terminal, arranged in a bank in groups according to the units digits, each group being separated from the next by a set of terminals representing the tens digit and a set of special terminals, a set of wipers and a magnet for controlling the movement of the wipers over the terminals, sources of different potentials, means for connecting certain predetermined potentials from the sources to the test terminals of the units sets and to the tens sets in accordance with the numerical designation of the line, means for connecting one of the sources to one of the talking terminals of the special set, a register for establishing a connection through a final selector in accordance with the numerical designation of the called line, a detector in said register having two input circuits, means controlled by the calling subscriber for applying a potential from one of said sources to one input circuit of said detector depending upon the numerical designation of the called line, means for operating the detector when two potentials of the same magnitude or bearing a predetermined relation with each other are applied to the two input circuits, a circuit including the selector magnet, a first test relay operated by the detector and a second test relay with its winding connected to a talking conductor and operated by a current of opposite polarity from that which operates the first test relay, means for causing the operation of either relay to open the circuit for the selector magnet to stop the selector, and means in said register for connecting the detector to the test circuit a second time after the wipers have been stopped by the operation of the second test relay to determine if said special potential is present on said talking terminal.

GERALD DEAKIN.

REFERENCES CITED

The following references are of record in the file of this patent:

UNITED STATES PATENTS

| Number | Name | Date |
|---|---|---|
| Re. 22,794 | Deakin | Oct. 1, 1946 |
| Re. 22,861 | Deakin et al. | Apr. 8, 1947 |
| 2,238,223 | Kozma | Apr. 15, 1941 |
| 2,354,682 | Herbig | Aug. 1, 1944 |
| 2,380,950 | Deakin | Aug. 7, 1945 |